United States Patent
Stentiford

(10) Patent No.: US 7,620,249 B2
(45) Date of Patent: Nov. 17, 2009

(54) ANALYSIS OF PATTERNS

(75) Inventor: Frederick W M Stentiford, Suffolk (GB)

(73) Assignee: British Telecommunications public limited company, London (GB)

( * ) Notice: Subject to any disclaimer, the term of this patent is extended or adjusted under 35 U.S.C. 154(b) by 238 days.

(21) Appl. No.: 11/661,984

(22) PCT Filed: Aug. 26, 2005

(86) PCT No.: PCT/GB2005/003339

§ 371 (c)(1), (2), (4) Date: Mar. 6, 2007

(87) PCT Pub. No.: WO2006/030173

PCT Pub. Date: Mar. 23, 2006

(65) Prior Publication Data

US 2008/0075372 A1    Mar. 27, 2008

(30) Foreign Application Priority Data

Sep. 17, 2004 (GB) .................................. 0420727.0
Feb. 25, 2005 (GB) .................................. 0503944.1

(51) Int. Cl.
G06K 9/68 (2006.01)

(52) U.S. Cl. ........................ 382/218; 382/100; 382/181; 382/209; 382/305; 382/274

(58) Field of Classification Search ................. 382/100, 382/181, 218, 209, 144, 305, 274; 358/1.9; 707/100
See application file for complete search history.

(56) References Cited

U.S. PATENT DOCUMENTS 4,646,352 A    2/1987    Asai et al.

(Continued)

FOREIGN PATENT DOCUMENTS

EP        0098152        1/1984

(Continued)

OTHER PUBLICATIONS

Lutton et al., "Contribution to the Determination of Vanishing Points Using Hough Transform", 1994 IEEE Transactions on Pattern Analysis and Machine Intelligence, vol. 16, No. 4, Apr. 1994, pp. 430-438.

(Continued)

*Primary Examiner*—Yubin Hung
*Assistant Examiner*—Ali Bayat
(74) *Attorney, Agent, or Firm*—Nixon & Vanderhye PC

(57) ABSTRACT

A first pattern (A) is represented by a first ordered set of elements ($x_i$) each having a value whilst a second pattern (B) is represented by a second ordered set of element ($u_i$) each having a value. The patterns are analysed by iteratively performing the steps of: selecting (e.g. at random) a plurality m of elements from the first ordered set; for each selected element $x_i$ of the first ordered set, selecting an element $u_i$ from the second ordered set, such that the selected elements of the second ordered set have, within the second ordered set, a set of positional relationships relative to each other that is the same as, or a transformation of, the set of positional relationships that the selected plurality of elements of the first ordered set have relative to each other, comparing the value of each of the selected elements of the first ordered set with the value of the correspondingly positioned selected element of the second ordered set in accordance with a predetermined match criterion to produce a decision that the selected plurality of elements of the first ordered set does or does not match the selected plurality of elements of the second ordered set; and in the event of a match, updating at least one similarity score ($S_{AB}$). In the selection of the elements of the second ordered set, one chooses (e.g. at random) at least one parameter (R, β, α) and selects elements having a set of positional relationships ($d_i'$, $d_i''$)) that is transformed from the positional relationship set $d_i$ of the selected elements of the first ordered set in accordance with the parameter(s). This transformation may include one or more of rotation, reflection or scaling. Other aspects include biasing the selection of the elements of the first ordered set towards a large extent, and of introducing variations in the number of elements selected, with the similarity score being updated by an amount that is a function of the number of elements. The method may also be applied to a single image.

17 Claims, 5 Drawing Sheets

U.S. PATENT DOCUMENTS

| | | | |
|---|---|---|---|
| 5,113,454 | A | 5/1992 | Marcantonio et al. |
| 5,200,820 | A | 4/1993 | Gharavi |
| 5,303,885 | A | 4/1994 | Wade |
| 5,790,413 | A | 8/1998 | Bartusiak et al. |
| 5,825,016 | A | 10/1998 | Nagahata et al. |
| 5,867,813 | A | 2/1999 | Di Pietro et al. |
| 5,978,027 | A | 11/1999 | Takeda |
| 6,094,507 | A | 7/2000 | Monden |
| 6,111,984 | A | 8/2000 | Fukasawa |
| 6,240,208 | B1 | 5/2001 | Garakani et al. |
| 6,266,676 | B1 | 7/2001 | Yoshimura et al. |
| 6,282,317 | B1 | 8/2001 | Luo et al. |
| 6,304,298 | B1 | 10/2001 | Steinberg et al. |
| 6,389,417 | B1 | 5/2002 | Shin et al. |
| 6,480,629 | B1 * | 11/2002 | Bakhmutsky ............... 382/236 |
| 6,590,937 | B1 * | 7/2003 | Ogura et al. ........... 375/240.16 |
| 6,778,699 | B1 | 8/2004 | Gallagher |
| 6,934,415 | B2 | 8/2005 | Steintiford |
| 6,996,291 | B2 * | 2/2006 | Nahum ....................... 382/278 |
| 2001/0013895 | A1 | 8/2001 | Aizawa et al. |
| 2002/0081033 | A1 | 6/2002 | Stentiford |
| 2002/0126891 | A1 | 9/2002 | Osberger |
| 2005/0031178 | A1 | 2/2005 | Park |
| 2005/0074806 | A1 | 4/2005 | Skierczynski et al. |
| 2005/0169535 | A1 | 8/2005 | Stentiford |
| 2006/0050993 | A1 | 3/2006 | Stentiford |

FOREIGN PATENT DOCUMENTS

| | | |
|---|---|---|
| EP | 1 126 411 A1 | 8/2001 |
| EP | 1286539 A1 | 2/2003 |
| GB | 1417721 | 12/1975 |
| JP | 03-238533 | 10/1991 |
| JP | 3-238566 | 10/1991 |
| JP | 06-245064 | 9/1994 |
| JP | 07-027537 | 1/1995 |
| JP | 2000-512790 | 9/2000 |
| JP | 2002-50066 | 2/2002 |
| JP | 2002-050066 | 2/2002 |
| WO | WO 82/01434 | 4/1982 |
| WO | WO 90/03012 | 3/1990 |
| WO | WO 99/05639 | 2/1999 |
| WO | WO 99/60517 | 11/1999 |
| WO | WO 00/33569 | 6/2000 |
| WO | WO 01/31638 A1 | 5/2001 |
| WO | WO 01/61648 A2 | 8/2001 |
| WO | WO 02/21446 A1 | 3/2002 |
| WO | WO 02/098137 A1 | 12/2002 |
| WO | WO 03/081523 A1 | 10/2003 |
| WO | WO 03/081577 A1 | 10/2003 |
| WO | WO 2004/042645 A1 | 5/2004 |
| WO | WO 2004/057493 A2 | 8/2004 |
| WO | WO 2005/057490 A2 | 6/2005 |
| WO | WO 2006/030173 A1 | 3/2006 |

OTHER PUBLICATIONS

McLean et al., "Vanishing Point Detection by Line Clustering", IEEE Transactions on Pattern Analysis and Machine Intelligence, vol. 17, No. 11, Nov. 1995, pp. 1090-1095.

Koizumi et al., "A New Optical Detector for a High-Speed AF Control", 1996 IEEE, pp. 1055-1061.

Itti et al., "Short Papers: A Model of Saliency-Based Visual Attention for Rapid Scene Analysis", IEEE Transactions on Pattern Analysis and Machine Intelligence, vol. 20, No. 11, Nov. 1998, pp. 1254-1259.

Shufelt, "Performance Evaluation and Analysis of Vanishing Point Detection Techniques", in Analysis and Machine Intelligence, vol. 21, No. 3, Mar. 1999, pp. 282-288.

Wixson, "Detecting Salient Motion by Accumulating Directionally-Consistent Flow", IEEE Transactions on Pattern Analysis and Machine Intelligence, vol. 22, No. 8, Aug. 2000, pp. 774-780.

Privitera et al., "Algorithms for Defining Visual Regions-of-Interest: Comparison with Eye Fixations", IEEE Transactions on Pattern Analysis and Machine Intelligence, vol. 22, No. 9, Sep. 2000, pp. 970-982.

Smeulders et al., "Content-Based Image Retrieval at the End of the Early Years", IEEE Transactions on Pattern Analysis and Machine Intelligence, vol. 22, No. 12, Dec. 2000, pp. 1349-1380.

Vailaya et al., "Image Classification for Content-Based Indexing", IEEE Transactions on Image Processing, vol. 10, No. 1, Jan. 2001, pp. 117-130.

Almansa et al., "Vanishing Point Detection Without Any A Priori Information", IEEE Transactions on Pattern Analysis and Machine Intelligence, vol. 25, No. 4, Apr. 2003, pp. 502-507.

Santini et al., "Similarity Matching", Proc $2^{ND}$ Asian Conf on Computer Vision, pp. II 544-548, IEEE, 1995.

Rui et al., "A Relevance Feedback Architecture for Content-Based Multimedia Information Retrieval Systems", 1997 IEEE, pp. 82-89.

Walker et al., "Locating Salient Facial Features Using Image Invariants", Proc. $3^{RD}$ IEEE International Conference on Automatic Face and Gesture Recognition, 1998, pp. 242-247.

Mahlmeister et al., "Sample-guided Progressive Image Coding", Proc. Fourteenth Int. Conference on Pattern Recognition, Aug. 16-20, 1998, pp. 1257-1259, vol. 2.

Osberger et al., "Automatic Identification of Perceptually Important Regions in an Image", Proc. Fourteenth Int. Conference on Pattern Recognition, Aug. 16-20, 1998, pp. 701-704, vol. 1.

Buhmann et al., "Dithered Colour Quantisation", Eurographics 98, Sep. 1998, http://opus.fu-bs.de/opus/volltexte/2004/593/pdf/TR-tubs-cq-1998-01.pdf.

Rui et al., "Relevance Feedback: A Power Tool for Interactive Content-Based Image Retrieval", IEEE Transactions on Circuits and Systems for Video Technology, vol. 8, No. 5, Sep. 1998, pp. 644-655.

Gallet et al., "A Model of the Visual Attention to Speed up Image Analysis", Proceedings of the 1998 IEEE International Conference on Image Processing (ICIP-98), Chicago, Illinois, Oct. 4-7, 1998, IEEE Computer Society, 1998, ISBAN-08186-8821-1, vol. 1, pp. 246-250.

Curtis et al., "Metadata—The Key to Content Management Services", $3^{RD}$ IEEE Metadata Conference, Apr. 6-7, 1999.

Stentiford, "Evolution: The Best Possible Search Algorithm?", BT Technology Journal, vol. 18, No. 1, Jan. 2000, (Movie Version).

Rother, "A New Approach for Vanishing Point Detection in Architectural Environments", $11^{TH}$ British Machine Vision Conference, Bristol, UK, Sep. 2000, http://www.bmva.ac.uk/bmvc/2000/papers/p39.pdf.

Sebastian et al., "Recognition of Shapes by Editing Shock Graphs", Proc. ICCV 2001, pp. 755-762.

Stentiford et al., "Automatic Identification of Regions of Interest with Application to the Quantification of DNA Damage in Cells", Human Vision and Electronic Imaging VII, B.E. Rogowitz, T.N. Pappas, Editors, Proc. SPIE vol. 4662, pp. 244-253, San Jose, Jan. 20-26, 2002.

Xu et al., "Video Summarization and Semantics Editing Tools", Storage and Retrieval for Media Databases, Proc. SPIE, vol. 4315, San Jose, Jan. 21-26, 2001.

Stentiford, "An Estimator for Visual Attention Through Competitive Novelty with Application to Image Compression", Picture Coding Symposium 2001, Apr. 25-27, 2001, Seoul, Korea, pp. 101-104, http://www.ee.ucl.ac.uk/-fstentif/PCS2001-pdf.

Cantoni et al., "Vanishing Point Detection: Representation Analysis and New Approaches", 11th Int. Conf. on Image Analysis and Processing, Palermo, Italy, Sep. 26-28, 2001.

Ouerhani et al., "Adaptive Color Image Compression Based on Visual Attention", Proc. 11 TH Int. Conference on Image Analysis and Processing, Sep. 26-28, 2001, pp. 416-421.

Russ et al., "Smart Realisation: Delivering Content Smartly", J. Inst. BT Engineers, vol. 2, Part 4, pp. 12-17, Oct.-Dec. 2001.

Bradley et al., "JPEG 2000 and Region of Interest Coding", Digital Imaging Computing—Techniques and Applications, Melbourne, Australia, Jan. 21-22, 2002.

Roach et al., "Recent Trends in Video Analysis: A Taxonomy of Video Classification Problems", 6TH Iasted Int. Conf. on Internet and Multimedia Systems and Applications, Hawaii, Aug. 12-14, 2002, pp. 348-353.

Bradley et al., "Visual Attention for Region of Interest Coding in JPEG 2000", Journal of Visual Communication and Image Representation, vol. 14, pp. 232-250, 2003.

Stentiford, "An Attention Based Similarity Measure with Application to Content-Based Information Retrieval", Storage and Retrieval for Media Databases 2003, M.M. Yeung, R.W. Lienhart, C-S Li, Editors, Proc SPIE vol. 5021, Jan. 20-24, Santa Clara, 2003.

Stentiford, "the Measurement of the Salience of Targets and Distractors through Competitive Novelty", 26th European Conference on Visual Perception, Paris, Sep. 1-5, 2003, (Poster).

Stentiford, "An Attention Based Similarity Measure for Fingerprint Retrieval", Proc. 4TH European Workshop on Image Analysis for Multimedia Interactive Services, pp. 27-30, London, Apr. 9-11, 2003.

Okabe et al., Object Recognition Based on Photometric Alignment Using RANSAC, Proceedings of the 2003 IEEE Computer Society Conference on Computer Vision and Pattern Recognition (CVPR'03), vol. 2, pp. 221-228, Jun. 19-20, 2003.

Oyekoya et al., "Exploring Human Eye Behaviour Using a Model of Visual Attention", International Conference on Pattern Recognition 2004, Cambridge, Aug. 23-26, 2004, pp. 945-948.

Stentiford, "A Visual Attention Estimator Applied to Image Subject Enhancement and Colour and Grey Level Compression", International Conference on Pattern Recognition 2004, Cambridge, Aug. 23-26, 2004, pp. 638-641.

Rasmussen, "Texture-Based Vanishing Point Voting for Road Shape Estimation", British Machine Vision Conference, Kingston, UK, Sep. 2004, http://www.bmva.ac.uk/bmvc/2004/papers/paper_261.pdf.

Finlayson et al., "Illuminant and Device Invariant Colour Using Histogram Equalisation", Pattern Recognition, vol. 38, No. 2 (Feb. 2005), pp. 179-190.

Stentiford, "Attention Based Facial Symmetry Detection", International Conference on Advances in Pattern Recognition, Bath, UK, Aug. 22-25, 2005.

Stentiford, "Attention Based Symmetry Detection in Colour Images", IEEE International Workshop on Multimedia Signal Processing, Shanghai, China, Oct. 30-Nov. 2, 2005.

Wang et al., "Efficient Method for Multiscale Small Target Detection from a Natural Scene", 1996 Society of Photo-Optical Instrumentation Engineers, Mar. 1996, pp. 761-768.

Rohwer et al., "The Theoretical and Experimental Status of the n-Tuple Classifier", Neural Networks, vol. 11, No. 1, pp. 1-14, 1998.

Brown, A Survey of Image Registration Techniques, ACM Computing Surveys, vol. 24, No. 4, Dec. 1992, pp. 325-376.

Zhao et al., "Face Recognition: A Literature Survey", CVLK Technical Report, University of Maryland, Oct. 2000, ftp://ftp.cfar.umd.edu/TRs/CVL-Reports-2000/TR4167-zhao.ps.qz.

Stentiford, "An Evolutionary Programming Approach to the Simulation of Visual Attention," CEC 2001, published May 29, 2001.

Zhao et al., "Morphology on Detection of Calcifications in Mammograms," Digital Signal Processing 2, Estimation, VLSI, San Franciso, Mar. 23-26, 1992, Proceedings of the International Conference on Acoustics, Speech and Signal Processing (ICASSP), New York, IEEE, US, vol. 5, Conf. 17, Mar. 23, 1992, pp. 129-132, XP010059006.

Raeth et al., "Finding Events Automatically in Continuously Sampled data Streams Via Anomaly Detection," Proceedings of the IEEE 2000 National Aerospace and Electronics Conference, NAECON 2000, Engineering Tomorrow (Cat. No. 00CH37093), Proceedings of the IEEE 200 National Aerospace and Electronics Conference, NAECON 2000, Engineering Tomorrow, Dayton, pp. 580-587, XP002224776.

Stentiford et al., "An Evolutionary Approach to the Concept of Randomness," The Computer Journal, pp. 148-151, Mar. 1972.

International Search Report mailed Jun. 24, 2003 in International Application No. PCT/GB03/01211.

International Search Report mailed Apr. 2, 2002 in International Application No. PCT/SG01/00112.

European Search Report dated Jan. 8, 2003 for RS 108248 GB.

European Search Report dated Jan. 9, 2003 for RS 108249 GB.

European Search Report dated Jan. 8, 2003 for RS 108250 GB.

European Search Report dated Jan. 9, 2003 for RS 108251 GB.

International Search Report mailed Feb. 9, 2006 in PCT/GB2005/003339.

Chang et al., "Fast Algorithm for Point Pattern Matching: Invariant to Translations, Rotations and Scale Changes," Pattern Recognition, vol. 30, No. 2, Feb. 1997, pp. 311-320.

English-language translation of Japanese Search Report dated Feb. 26, 2008, in JP 2003-579167.

International Search Report dated Jun. 12, 2003, in PCT/GB03/01211.

International Search Report dated Mar. 18, 2002, in PCT/SG01/00112.

* cited by examiner

ANALYSIS OF PATTERNS

This application is the US national phase of international application PCT/GB2005/003339 filed 26 Aug. 2005 which designated the U.S. and claims benefit of GB 0420727.0 and GB 0503944.1, dated 17 Sep. 2004 and 25 Feb. 2005, respectively, the entire content of which is hereby incorporated by reference.

The present invention is concerned with comparing one pattern with another, or of a pattern with itself, and is of particular interest in the comparison of two-dimensional patterns such as visual images, although applicable also to one-dimensional patterns and patterns having three or more dimensions. Standard approaches to pattern recognition use templates to recognise and categorise patterns [1]. Such templates take many forms but they are normally produced by a statistical analysis of training data and matched with unseen data using a similarity measure [2]. The statistical analysis is normally carried out over a number of intuitively selected features that appear to satisfy the needs of the recognition task. For example, in speech recognition templates can be encapsulated as Hidden Markov Models derived in the frequency domain and in Optical Character Recognition the templates take the form of the character fonts themselves. In the case of face recognition a number of intuitively chosen features such as skin texture, skin colour and facial feature registration are used to define face templates [5]. In a CCTV surveillance application intruders are normally detected through a process of frame subtraction and background template modelling which detects movement and removes background effects from the processing [3]. In many cases the number of features leads to a computationally unmanageable process and Principal Components Analysis and other techniques are used to scale down the problem without significantly reducing performance [http://www.partek.com/index.html]. These approaches achieve great success in non-noisy environments but fail when the pattern variability and number of pattern classes increase.

Some techniques for analysis of images or other patterns where the pattern is compared with other parts of the same pattern are described in our earlier patent applications as follows.

European patent application 00301262.2 (publication No. 1126411) (applicants ref. A25904EP#);

International patent application PCT/GB01/00504 (publication No. WO 01/61648) (applicants ref. A25904WO);

International patent application PCT/GB01/03802 (publication No. WO02/21446) (applicants ref. A25055WO);

U.S. patent application Ser. No. 977,263/09 filed 16 Oct. 2001 (publication No. 20020081033) (applicants ref. A25904US1);

as well as the following papers published by the inventor:

Stentiford F W M, "An estimator for visual attention through competitive novelty with application to image compression", Proc. Picture Coding Symposium 2001, Seoul, 25-27 April, pp 101-104, 2001.

Stentiford F W M, "An evolutionary programming approach to the simulation of visual attention", Proc. Congress on Evolutionary Computation 2001, Seoul, pp 851-858, 27-30 May, 2001.

Methods and apparatus for comparing patterns are described in our earlier international patent application WO03/081523.

Aspects of the present invention are set out in the claims.

Some embodiments of the present invention will now be described, with reference to the accompanying drawings, in which.

Figure 1:
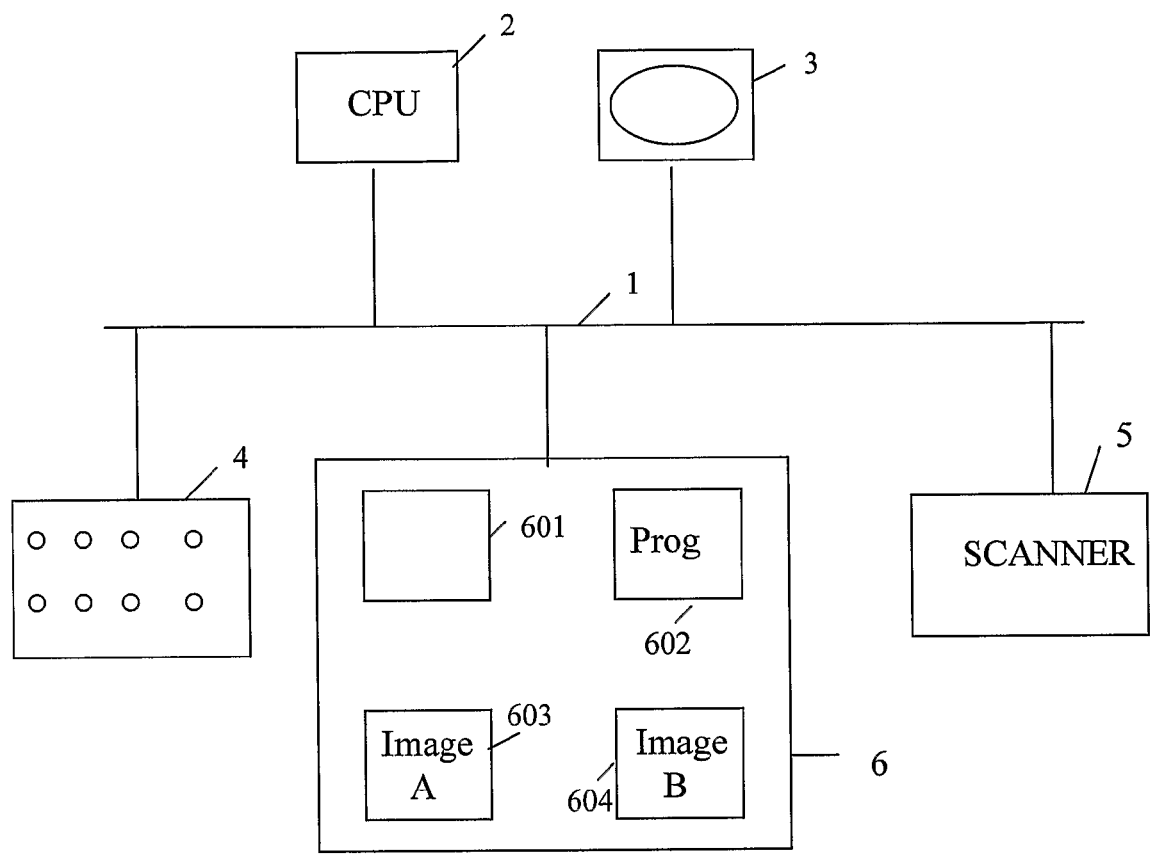
FIG. 1 is a block diagram of an apparatus for performing the invention.

FIG. 1 shows an apparatus consisting of a general purpose computer programmed to perform image analysis according to a first embodiment of the invention. It has a bus 1, to which are connected a central processing unit 2, a visual display 3, a keyboard 4, a scanner 5 (or other device, not shown) for input of images, and a memory 6.

In the memory 6 are stored an operating system 601, a program 602 for performing the image analysis, and storage areas 603, 604 for storing two images, referred to as image A and image B. Each image is stored as a two-dimensional array of values, each value representing the brightness of a picture element within the array. It will be understood, however that the apparatus might more generally be arranged to analyse data sets other than images, in which case the storage areas 603, 604 would each contain a data set A, B, each being an ordered set of value, ordered in any number of dimensions (the same number of dimensions in each set).

Figure 2A:
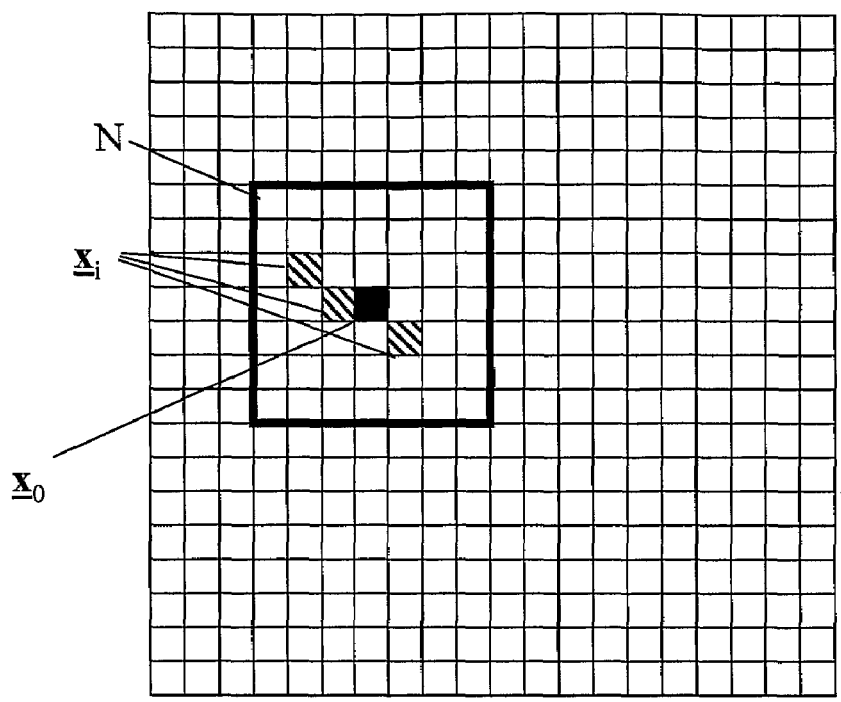
FIG. 2 is a diagram illustrating operation of the invention.
Figure 2B:
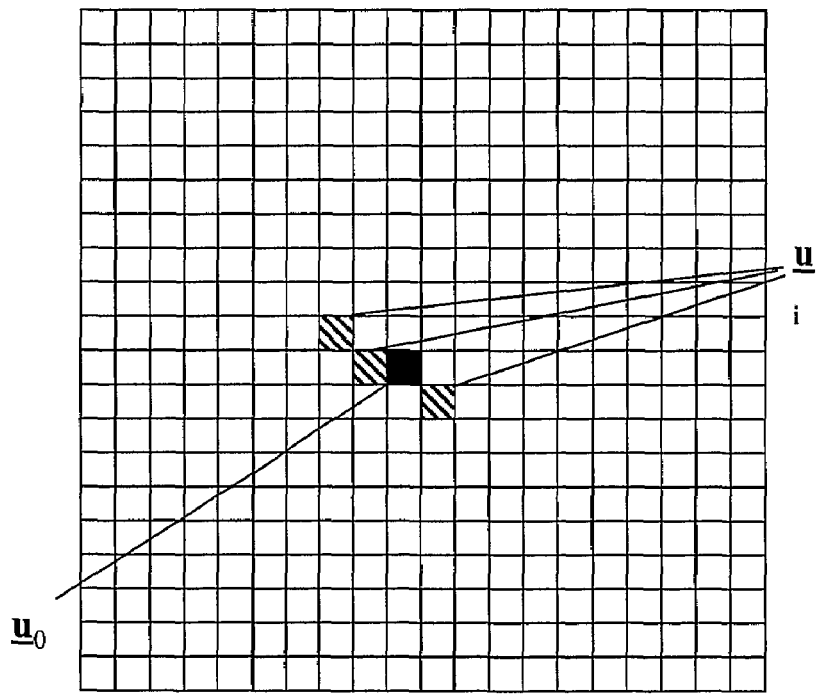

The image arrays are shown schematically in FIGS. 2a and 2b. Image A consists of an array of picture elements $\underline{x}_i = (x_i, y_i)$ where $x_i$ and $y_i$ are the horizontal and vertical positions of the elements within the image. A 20×20 array is shown, for the purposes of illustration. In the general case, $\underline{x}_i = (x_{i1}, x_{i2}, x_{i3}, \ldots x_{in})$ where $x_{ij}$ are the n coordinates of $\underline{x}_i$ in n dimensions. Each element has a respective value $a = a(\underline{x}_i)$. This may be a scalar value a or vector (multidimensional) value a. In the case of an image these would be the brightness a, or alternatively a set of colour components such as (in r, g, b representation) $a = (a_r, a_g, a_b)$ Similarly, the image B consists of an array of picture elements $\underline{u}_i = (u_i, v_i)$ having brightness values $b(\underline{u}_i)$. In the general case, $\underline{u}_i = (u_{i1}, u_{i2}, u_{i3}, \ldots u_{in})$.

Figure 3:
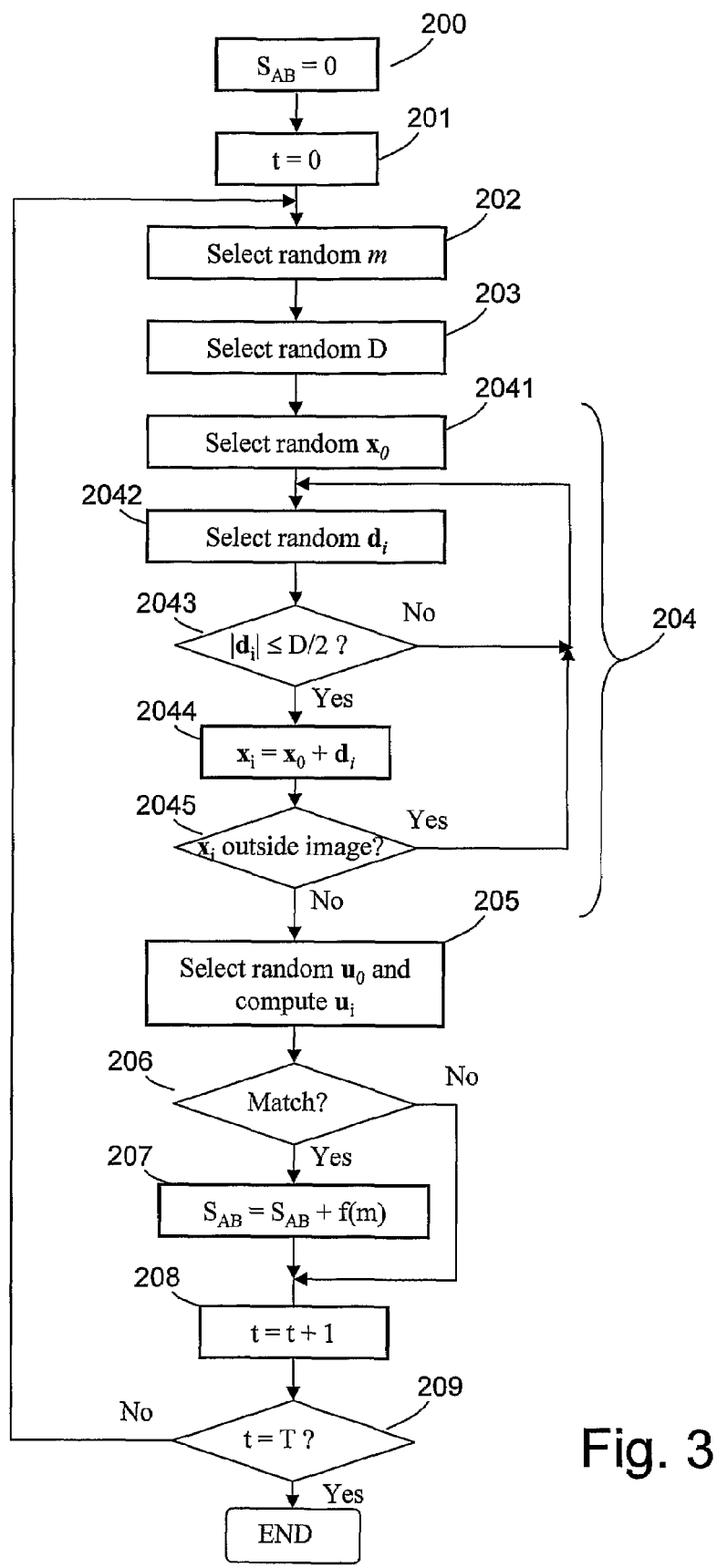
FIG. 3 is a flowchart of the steps to be performed by the apparatus of FIG. 1 in accordance with a first embodiment of the invention.

FIG. 3 is a flowchart explaining the application of the method as applied to two-dimensional images A, B. In Step 200, a score $S_{AB}$ is set to zero, and (201) a counter t set to zero.

The first task of the method is to make a random selection of elements in image A. This may be visualised as stabbing the image with an irregular fork having m times. The actual number m of elements may be selected (Step 202) at random within the range $m_{mins} \leq m \leq m_{max}$, or m may be fixed, in which case Step 202 would be omitted. The fork size is limited by a diameter D selected as a random number $D_{min} \leq D \leq D_{max}$ (Step 203). Other approaches to varying the distribution of fork size will be discussed later. Note that, throughout this specification, references to a random selection also envisage the possibility of selection by means of a pseudo-random process. Also, a reference to random selection envisages the possibility not only of a random selection for which the selection of any value (within a range specified) is equally probable, but also of a selection in accordance with a non-uniform probability distribution.

At Step 204 a set $N_x$ of m elements at random positions $x_i$ are selected, subject to the constraint that all elements lie within the image and all elements lie within a circular area of diameter D. One possible method of doing this is as follows:

2041 Choose a random element $x_0$ in A.

2042 Choose a set of random displacements $d_i = (d_{xi}, d_{yi})$, where $0 \leq d_{xi} \leq D/2$ and $0 \leq d_{yi} \leq D/2$.

2043 If the Euclidean distance $|d_i| \leq D/2$, then continue; otherwise repeat the previous step until this condition is satisfied. Where $|d_i| = \sqrt{\{d_{xi}^2 + d_{yi}^2\}}$.

2044 Compute positions $x_i = x_0 + d_i$

2045 If any $x_i$ lies outside the image area, repeat steps 2042 to 2045 in respect of the offending $d_i$.

Note that this process permits the occurrence of one or more pairs $x_i = x_j$ $i \neq j$ i.e. the $x_i$ are not constrained to be distinct. This is not objectionable in practice but if desired may be eliminated by testing for it and reselecting one member of the matching pair in the same way as for elements falling outside the image area.

The next stage (Step 205) is to make a selection $N_u$ of m elements $u_i$ within image B, at a random overall position, but having the same positions relative to one another as the selected elements of image A. That is, $x_i - x_j = u_i - u_j$ for all i,j. This may be visualised as stabbing image B with the same fork as used on image A.

Assuming that a set of displacements $d_i$ have been calculated as above, this can be done by:

2051 Choose a random element $u_0$ in B.

2052 Compute positions $u_i = u_0 + d_i$

2053 If any $u_i$ lies outside the image area, repeat steps 2051 to 2043 in respect of the offending $d_i$.

At step 206 it is determined whether each of the selected elements in image A matches the element having the same relative position in image B. Where the value associated with each element is a scalar value, in this case representing brightness, the test is that a match is deemed to occur if $|a(x_i) - b(u_i)| < \delta$ for all $i = 1 \ldots m$ where $\delta$ is some small threshold value In the vector case (e.g. r, g, b) a match occurs if $\text{Dist}[a(x_i) - b(u_i)] < \delta$ for all $i = 1 \ldots m$ Where Dist is some distance operator (e.g. Euclidean or city-block), or the vector components may be thresholded separately, e.g. for colour components $|b_r(x_i) - b_r(u_i)| < \delta_r$ and $|b_g(x_i) - b_g(u_i)| < \delta_g$ and $|b_b(x_i) - b_b(u_i)| < \delta_b$ for all $i = 1 \ldots m$.

If a match occurs, then at Step 207 the Score $S_{AB}$ is incremented. It could simply be incremented by 1 (or other fixed value). Where m is variable, the score could if desired be incremented by m or some function of m (to be discussed below).

Once the score has been updated, or if no match occurred, then the iteration counter t is tested at 209 to see if it has reached a maximum iteration count T, and if so, the process terminates. Otherwise the process returns to Step 202 for a further iteration.

A discussion of fork diameter is in order. If small forks are used, then the score or similarity measure will depend on local similarities and will assume high values if one image possesses many regions that are similar to those in the other. Large diameters give more weight to larger-scale similarities between images. If D is fixed, then one has a certain statistical distribution of actual fork diameters ranging from very small up to the maximum permitted by the particular value of D (by actual diameter we mean the diameter of the smallest circle that can enclose all the elements $x_i$ on a particular iteration). The random selection of D in the range $D_{min} \leq D \leq D_{max}$ allows actual diameters up to $D_{max}$ but skews their statistical distribution by favouring actual diameters less than $D_{min}$ at the expense of diameters between $D_{min}$ and $D_{max}$.

Alternative methods of skewing this distribution can be envisaged (including the possibility of favouring larger forks); for example one could proceed with a fixed value of D, then, for each selection of a set of $d_i$ ($i=1, \ldots$ m) one could calculate the actual diameter (or an estimate of it such as $\sqrt{\{[\text{Max}(d_{xi}) - \text{Min}(d_{xi})]^2 + [\text{Max}(d_{yi}) - \text{Min}(d_{yi})]^2\}}$) and discard the set or not with a probability corresponding to a desired function of the actual diameter.

Turning back to the score-incrementing step, in the case of variable m, the information value of a match rises according to its rarity. Thus a match obtained using a fork with many tines is more significant than one obtained using few tines. Hence the suggestion above that the match be incremented by m. More generally, one might increment the score by some monotonically increasing function f(m) of m rather than m itself. Functions that rise more rapidly than m itself may for example be used (such as $m^2$ or $2^m$).

We turn now to a second embodiment of the invention, which introduced a number of additional transformations of the fork applied to image B. The following description omits the random variation of in and D discussed above, though these could be included (or not) if desired.

The idea here is to allow matches to be obtained, and hence contributions to the total score to be generated, in situations where a feature appears in one image whilst a similar feature appears in the other image but is of a different size, is reversed, or is rotated with respect to the one in the first image. This is achieved by applying to image B a fork that is not the same as that applied to image A but is a scaled and/or reversed and/or rotated version of it.

Figure 4:
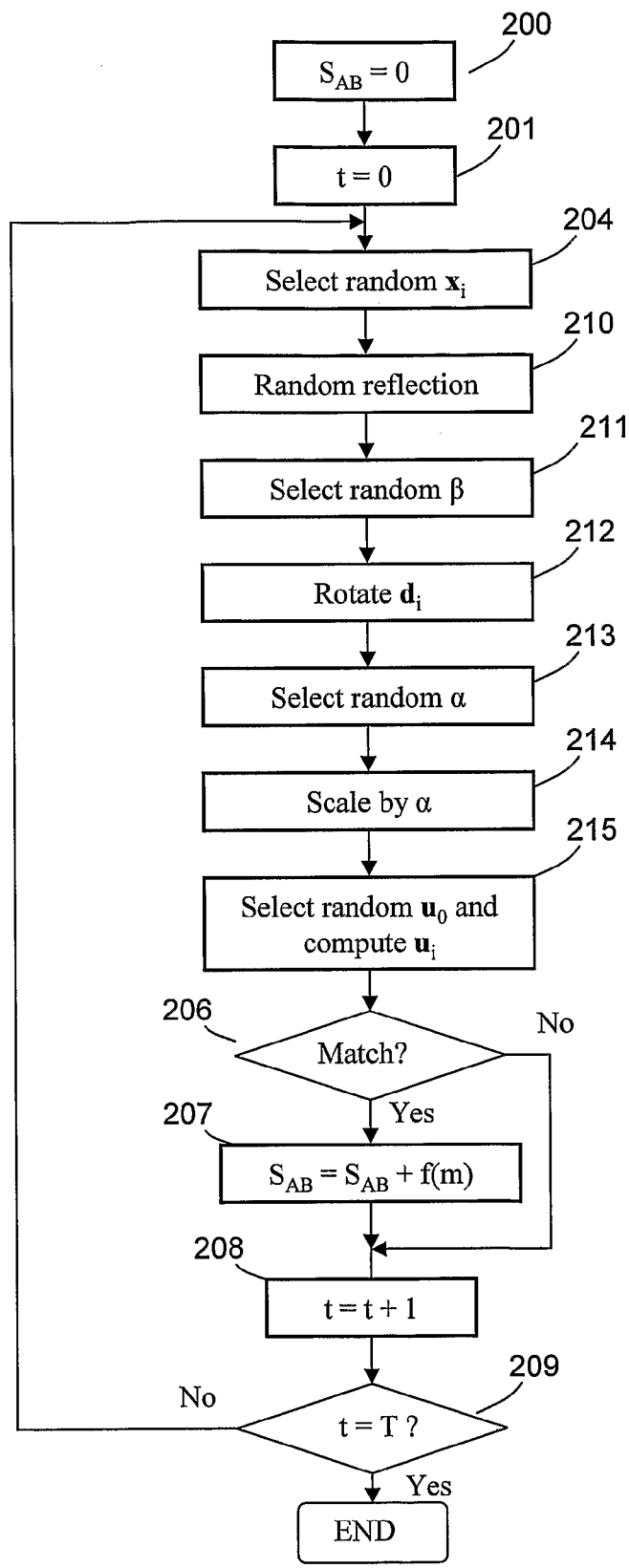
FIG. 4 is a flowchart of the steps to be performed by the apparatus of FIG. 1 in accordance with a second embodiment of the invention.

FIG. 4 shows a flowchart. Steps that are identical to those in FIG. 3 are given the same reference numerals. Steps 2041 to 2045 are not shown explicitly.

Following Step 204, a random reflection is applied to the fork:

Choose a random integer R as 0 or 1;

If R=1, set $d_{xi} = -d_{xi}$ for all $i=1 \ldots m$. $d_{yi}$ are unchanged.

This is a reflection about a single vertical axis. Reflections about other axes are encompassed by this reflection plus the rotation step that comes next.

Next (Step 211) choose a random rotation angle $\beta$ in the range $\beta_{max}$ to $\beta_{min}$. Then (212) the fork represented by $d_i$ is rotated by this angle by performing, for each i:

$d_{xi}' = d_{xi} \cos \beta - d_{yi} \sin \beta$ $d_{yi}' = d_{xi} \sin \beta + d_{yi} \cos \beta$ Thirdly, in Step 213, a random scale factor $\alpha$ is chosen in the range $\alpha_{min}$ to $\alpha_{max}$. The fork is then scaled at 214 by this factor:

$d_{xi}'' = \alpha \cdot d_{xi}'$ $d_{yi}'' = \alpha \cdot d_{yi}'$

The scaling and rotation are relative to (0,0), though scaling or rotation about any other centre would do just as well.

If desired, it would be possible to define $\alpha_x$, $\alpha_y$ separately in x and y directions, for example to spot longer or taller versions of the same shapes.

Step 215 then follows to determine the elements $u_i$ This is identical to Step 205 except that it uses the transformed $d_i''$ rather than $d_i$. Note that there is a possibility that the selection of the transformations, or even of $d_i$, may mean that it is difficult or even impossible to find, in Step 215 (which comprises the substeps 2051 to 2053 described earlier), a position $u_0$ such that all elements $u_i$ lie within image B. Thus, although not shown in the flowchart, it may be necessary in such an event to return to step 210 for a fresh selection of the transformation(s) or even return to step 204 for an entirely new fork.

Steps 206 to 209 are as described earlier.

Figure 5:
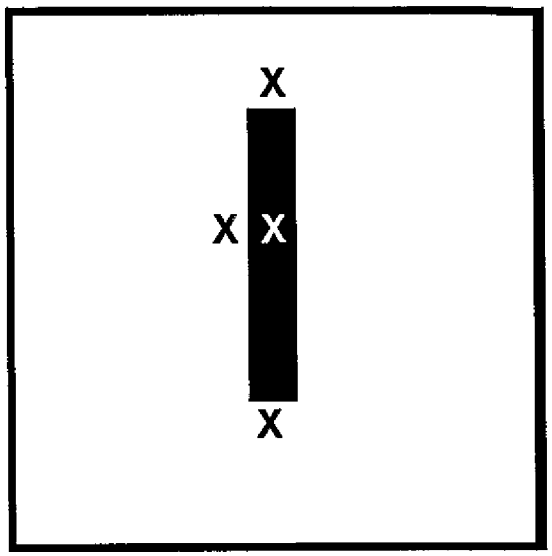
FIG. 5 illustrates a pair of images.
Figure 5:
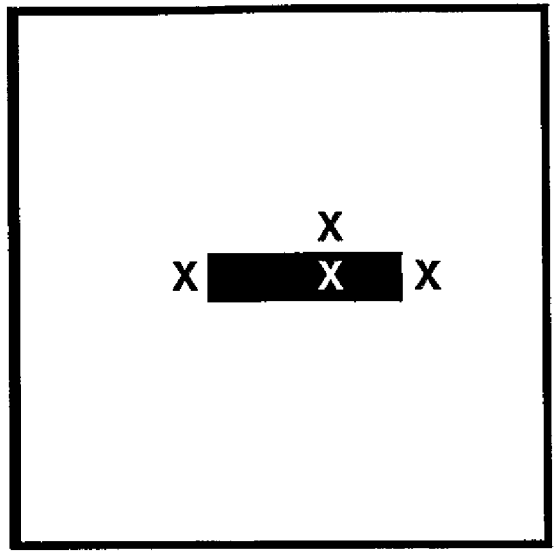

By way of illustration, FIG. 5 shows the two dimensional case in which a fork with m=4 pixels x in image A is matched with 4 pixels u in image B after a 90° rotation and a 25% scale reduction. Each of the pixels might possess three colour intensities, so $a=(a_r, a_g, a_b)$ and the pixels u match the x if the colour intensities of all m corresponding pixels have values within $\delta_j$ of each other.

Note that the reflection, rotation and scaling are linear operations and can be performed in any order. The use of these transforms in addition to translation means that structural similarities between the two images will not be obscured by reflection, rotation or differences in scale.

It is not essential to employ all three transformations. One may be used alone, or two in combination. It is probably rare that would want to allow reflection but not allow rotation, though it would be possible. If reflection about any axis were required, but not rotation, then either the reflection step could be modified to reflect about a randomly chosen axis, or (which amounts to the same thing) the rotation step could be retained but skipped when R=0. One might choose to allow scaling but not rotation in cases where similarities invariant to scale but not rotation are being sought—e.g. it might be required that diamond shapes are to be distinguished from squares.

In a further modification, values of parameters that result in a match may be recorded. A simple implementation of this would be, for example to record each rotation angle $\beta$ that results in a match. These values could be averaged. For example an average $\beta$ of 22° could be useful as indicating that image B is rotated 20° relative to image A. A spread in angles for each match would indicate a measure of circular symmetry present in both images. E.g. matches on a red ball in images A and B could occur for any angular rotation.

Similar processing might be applied to the scale factors $\alpha$.

Another example is to compute, in the case of a match the position of the centroid $g_x$ of $x_i$ and the centroid $g_u$ of $u_j$. Averaging $g_x$ would give the position in image A of a region that is similar to a region at a position in image B given by the average of $g_u$. In practice, since the centroid g is the average of $x_i$ (or $u_i$) then (if m constant) there is no need to calculate g and then average them; one could just average all the $x_i$ (or $u_i$) Again, this approach gives useful results only if the matches mainly result from one region in each image. A more sophisticated approach is to determine, for each match, whether the positions of the centroids $g_x$ and $g_u$ are similar to the centroid pair recorded for a previous match. E.g.

$Dist(g_x-g_x')<e$ and $Dist(g_u-g_u')<e$ (where Dist is the Euclidean distance or other distance operator and $g_x'$ $g_u'$ are the pair of centroids corresponding to an earlier match (or conceivably a running average of such earlier matched centroids) and e is some small threshold). This would imply that the match involved the same region as did the earlier match. One could then proceed by including the new result into the average only if this condition were satisfied. More than one average could be computed, for more than one different region, but to do this it would probably be more efficient to store the data for each match and process it at the end.

The set of region correspondences may be used to track objects between video frames or obtain non-linear registration between images (e.g. the registration of mammograms taken at different times). If image A is simultaneously compared with multiple images B, C, D, . . . , Z, the similarity measure may be used to detect the presence of specific objects or compare the state of scenes with a set of normal and abnormal states (e.g. for security purposes). In a similar fashion the system may be used to identify facial expressions or facial identities.

The same kind of averaging, conditional upon similarity of centroid positions could also be applied to the rotation angles. Such a process would indicate a strong similarity between a square and a diamond but only after a rotational transform of 45°, 135°, 225°, or 315°.

Typical values for the various parameters given above, for 600×400 images, are as follows

| | |
|---|---|
| $m_{min}$ | 1 |
| $m_{max}$ | 20 |
| $D_{min}$ | 1 |
| $D_{max}$ | A smaller value may be chosen for extracting region similarities, larger for global similarities. May range from 10 up to the smallest of the widths and heights of the two images |
| $\delta$ | 30 (assuming that a lies in the range 0 to 255) |
| $\delta r, \delta g, \delta b$ | 30 (assuming that r, g, b lie in the range 0 to 255) |
| T | 20000 |
| $\beta_{min}$ | −90 |
| $\beta_{max}$ | +90 |
| $\alpha_{min}$ | 0.5 |
| $\alpha_{max}$ | 2 |
| e | 10 |

In the case of images A, B both containing large plain areas of similar brightness (or colour), a large number of matches and hence a high score might be obtained even though there may be little similarity between the parts of the image that contain detail. In this case, the process need not necessarily be carried out for the whole image. For example, if regions of images A and B have been identified as being of special interest—perhaps using the method described in one of our earlier patent applications referred to above—then the picture elements x, u dealt with may be just those lying in the vicinity of the identified region. This could be implemented by constraining the selection of x and u such that at least one element $x_i$ is an element of a special interest region of image A and at least one element $u_j$ is an element of a special interest region of image B. This means that each match establishes a similar relationship in each image between the foreground and background, or foreground and foreground (if all tines lie on high interest pixels). Small diameter forks will tend to obtain similarities between localised regions in A and B, and larger forks will determine global relationships between foreground and background.

The methods described in two-dimensions can equally well be applied to one dimensional data such as temporal sequences of values (e.g. samples of an audio or other signal). However, rotation has no meaning in one dimension. They may likewise be applied in three (or more) dimensions, where, however rotation requires more angles (up to n−1) to be specified if rotation is to be permitted about more than one axis. Rotation has meaning only if the disturbed dimensions are in the same category. Thus a three dimensional set of values representing a sequence of visual images (x, y, t) (or a four-dimensional set representing a temporal sequence of three-dimensional visual images (x, y, z, t)) could be rotated only about axes parallel to the time axis.

Discussion

This method carries out an analysis of individual pairs of images and extracts structure that is common to both images. The amount of structure that is common to both images gives a measure of their similarity. Unlike other methods the approach makes no use of pre-defined feature measurements and it does not require representative training sets of images and associated processing to optimise recognition parameters.

Scale and Orientation Differences

Scale and orientation differences in the visual domain can arise because of perspective, viewing angle and other factors and it is common for prior knowledge to be incorporated in the classifier to compensate for such differences. Such prior knowledge is not necessary in this method because the matching process takes account of differences arising from object orientation and scale. This means, for example, that the method can be applied to recognition problems in which the object to be recognised is embedded in another image. This method therefore also has application to the problem of detecting copyright infringement where portions of material have been cropped from larger works (of art, for example), and the task of reducing the size of databases where it is known that duplication is prevalent.

Local Distortions

Unless provision is made for specific pattern content, the standard template approaches to pattern recognition fail when the patterns under comparison differ because of local distortions, or small movements, as would be the visual case with rustling trees, moving clouds, charges in facial expression, scene-of-crime fingerprints on irregular surfaces, or noise, for example. Such provision requires prior knowledge of the application and will still cause the system to fail if the unseen pattern distortions do not conform to the system design requirements. This method is able to minimise the effects of local distortions without prior knowledge of the type of distortion.

The method is also able to cope with partial patterns that contain gaps and omissions. It therefore has direct application to the problem of identifying scene-of-crime fingerprints where only a part of the total print is available for matching. In the case of facial recognition the method lends itself to searches based upon restricted portions of the unknown face. This means, for example, that searches can be carried out purely on the basis of the eye and nose region in cases where beards and moustaches might lead to ambiguity. However, the performance will degrade steadily as the distortions and gaps increase, but will not suddenly fail catastrophically.

Image Classification

The method may be used to calculate similarity scores between an image and a set of reference patterns. Similarity scores can be used to cluster groups of such patterns possessing high similarity scores relative to each other. Vantage patterns to which other patterns in the cluster are similar, taken from each cluster may themselves be clustered to form super-clusters and the process continued to structure very large pattern databases. Query-By-Example retrieval is carried out by measuring similarity scores to each of the top level vantage patterns and then to each of the vantage patterns in sub-clusters corresponding to the highest scoring vantage pattern in the previous cluster. It is likely that some vantage patterns will represent clusters with common elements in those cases where patterns possess high similarity scores with more than one vantage pattern. Patterns that may be handled in this way include faces and facial expressions. It may be applied to the categorisation of images of manufactured or processed materials such as sand and aggregates). In a military context a flying object might be detected and values of similarity scores would reveal whether the object was likely to be a bird or a plane.

The method may be applied to patterns of any dimension, such as one-dimensional audio signals, three dimensional video data (x, y, time), or n-dimensional time dependent vectors derived from any source such as sensor arrays. In the case of speech recognition the method is able to handle variations in the speed of the speech without the use of special heuristics. A conventional approach uses Dynamic Time Warping to overcome this problem, but invokes greater computational effort and the danger of the warping process leading to increased misclassifications especially in a large multi-class problem. Furthermore portions of utterances would be sufficient for word identification using this method if they were unique in the domain of discourse (e.g. 'yeah' instead of 'yes', missing the final sibilant).

Disparity Processing

The method may be applied to the problem of disparity detection as is the case when detecting motion or parallax. Standard approaches to disparity detection rely heavily upon accurate registration between two images so that the subtraction (which may be carried out piecewise for a small areas of the total image) takes place between pixels that correspond to the same points on the original object pictured in the two images. The resulting difference-image highlights those areas that correspond to differences in the original images. This becomes extremely difficult if noise is present as uncertainty is introduced into the estimate of the correct registration position and many spurious differences can be generated as a result. Even if noise is absent local distortions or slight subject movements will cause mis-registration and areas of difference will be highlighted which are of little interest unless the distortion or movement itself is being measured. Linear or non-linear digital image registration techniques prior to subtraction partially compensates but does not eliminate this problem in a large proportion of cases [4]. This method obtains registration by locating correspondences between similar regions in a pair of images using features that are present in both regions; those regions that do not match are ignored. Such correspondences between regions in successive frames of a video can be applied to the problem of recognising and tracking moving objects.

This method also has the advantage of being able to detect multiple disparities in which image A is compared with images B, C, D, etc. This would be useful in the case of CCTV intruder detection in which image frames B, C, D, etc would be typical examples of different atmospheric conditions and other normal background states, and an alarm would be raised only if disparities were detected in all the normal image frames. It would also be applicable to the problem of measuring the likeness of facial images.

Single Image

Note that the method can be applied in the case where image A and image B are identical. Indeed, if desired, one could store a single image A in storage area 603 and storage area 604 becomes redundant (and references above to image B are replaced by image A).

In the case when image A is identical to image B, and the process is in effect considering a single image, a high similarity score ($S_{AA}$) may arise from application of the reflection transform if symmetry is present in the image across the axis of reflection. In a similar fashion rotational symmetry and the presence of perspective symmetries may be detected. The distributions of rotation and reflection axis angles at which matches are found indicate the orientations of the symmetries present in the image. Forks should include some high attention scoring pixels otherwise large background tracts of self-matching sky, for example, would appear to exhibit trivial symmetries. This could be achieved by restricting the process to one or more areas identified as being of special interest, as discussed earlier.

Hardware Implementation

The algorithm is eminently suitable for parallel implementation as the processing for each pixel fork is independent of the processing of other forks. This means that processing of forks may be distributed across many independent sources of computation thereby obtaining processing speeds that are only limited by the rate of data capture.

Some image analysis techniques carry out comparison calculations between images using patches that are forks in which all the pixels are employed. Patches match when a measure of correlation exceeds a certain threshold. These approaches are unable to make best use of detailed structure that is smaller than the size of the patch except in the case in which the correlation measure is designed to identify a specific texture. In addition such patches are of a defined size; if they are too large they fail to match anywhere; if they are too small they match in the wrong places. The sparse pixel forks $N_x$ used in this method do not suffer from these constraints.

REFERENCES

[1] Vailaya A. et al., Image Classification for Content-Based Indexing, IEEE Trans on Image Processing, Vol 10, No 1, pp 117-130, January 2001.
[2] Santini S. & Jain R., Similarity Matching, in Proc $2^{nd}$ Asian Conf on Computer Vision, pages II 544-548, IEEE, 1995.
[3] IEEE Trans PAMI—Special Section on Video Surveillance, vol 22 No 8, August 2000.
[4] Brown L. G., A survey of image registration techniques, ACM Computing Surveys, Vol. 24, No. 4 (December 1992), pp. 325-376.
[5] Zhao W., Chellappa R., Rosenfeld A., and Phillips P. J., "*Face recognition: A literature survey*." CVL Technical Report, University of Maryland, October 2000. <ftp://ftp.cfar.umd.edu/TRs/CVL-Reports-2000/TR4167-zhao.ps.gz>.
[6] Sebastian T. B., Klein P. N., and Kimia B. B., "Recognition of shapes by editing shock graphs," Proc ICCV 2001, pp 755-762. Source of data at http://www.lems.brown.edu/vision/researchAreas/SIID/

The invention claimed is:

1. A computer implemented method of comparing a first pattern (A) represented by a first ordered set of elements ($x_i$) each having a value with a second pattern (B) represented by a second ordered set of element ($u_i$) each having a value, comprising iteratively performing the steps of:
using at least one computer with accessible input/output to perform the following steps:
(i) selecting a plurality of elements from the first ordered set;
(ii) for each selected element of the first ordered set, selecting an element from the second ordered set, such that the selected elements of the second ordered set have, within the second ordered set, a set of positional relationships relative to each other that is a transformation of, the set of positional relationships that the selected plurality of elements of the first ordered set have relative to each other,
(iii) comparing the value of each of the selected elements of the first ordered set with the value of the correspondingly positioned selected element of the second ordered set in accordance with a predetermined match criterion to produce a decision that the selected plurality of elements of the first ordered set does or does not match the selected plurality of elements of the second ordered set;
(iv) in the event of a match, updating at least one similarity score ($S_{AB}$);
wherein the step of selecting the elements of the second ordered set comprises choosing a value for at least one parameter (R, β, α) and selecting elements having a set of positional relationships ($d_i'$, $d_i''$) that is transformed from the positional relationship set ($d_i$) of the selected elements of the first ordered set in accordance with the parameter(s)
wherein the said parameter (R) determines whether or not a reflection should be applied to the positional relationships.

2. A computer implemented method of analysing a pattern (A) represented by an ordered set of elements ($x_i$) each having a value, comprising iteratively performing the steps of:
using at least one computer with accessible input/output to perform the following steps:
(i) selecting a first plurality of elements from the ordered set;
(ii) for each selected element of the ordered set, selecting a further element from the ordered set, such that the selected further elements of the ordered set have, within the ordered set, a set of positional relationships relative to each other that is a transformation of, the set of positional relationships that the selected first plurality of elements of the ordered set have relative to each other,
(iii) comparing the value of each of the first selected elements of the ordered set with the value of the correspondingly positioned selected further element of the ordered set in accordance with a predetermined match criterion to produce a decision that the selected first plurality of elements of the ordered set does or does not match the selected further plurality of elements of the ordered set;
(iv) in the event of a match, updating at least one similarity score (SAA);
wherein the step of selecting the further elements of the ordered set comprises choosing a value for at least one parameter (R, β, α) and selecting elements having a set of positional relationships ($d_i'$, $d_i''$) that is transformed from the positional relationship set ($d_i$) of the selected first elements of the ordered set in accordance with the parameter(s)
wherein the said parameter (R) determines whether or not a reflection should be applied to the positional relationships.

3. A method according to claim 1 in which the selection of a plurality of elements from the first ordered set from the ordered set is random or pseudo-random.

4. A method according to claim 1-in which the selection of the parameter(s) is random or pseudo-random.

5. A method according to claim 1 in which the said parameter (β) determines whether and the degree to which a rotation is to be applied to the positional relationships.

6. A method according to claim 1 in which the said parameter (α) determines whether and the degree to which a scaling is to be applied to the positional relationships.

7. A method according claim 1 including analysing those values of the parameters that result in a match.

8. A method according to claim 1 wherein the selections of elements in the first ordered set is such that their extent, within the ordered set, is biased towards a small extent rather than a large extent.

9. A computer implemented method of comparing a first pattern represented by a first ordered set of elements each having a value with a second pattern represented by a second ordered set of element each having a value, comprising iteratively performing the steps of:
  using at least one computer with accessible input/output to perform the following steps:
  (i) selecting a plurality of elements from the first ordered set;
  (ii) for each selected element of the first ordered set, selecting an element from the second ordered set, such that the selected elements of the second ordered set have, within the second ordered set, a set of positional relationships relative to each other that is a transformation of, the set of positional relationships that the selected plurality of elements of the first ordered set have relative to each other,
  (iii) comparing the value of each of the selected elements of the first ordered set with the value of the correspondingly positioned selected element of the second ordered set in accordance with a predetermined match criterion to produce a decision that the selected plurality of elements of the first ordered set does or does not match the selected plurality of elements of the second ordered set;
  (iv) in the event of a match, updating at least one similarity score;
  wherein the selections of elements in the first ordered set is such that their extent, within the ordered set, is biased towards a small extent rather than a large extent
  wherein a parameter (R) associated with the second ordered set determines whether or not a reflection should be applied to the positional relationships.

10. A method according to claim 8 comprising defining a bounded region of the first ordered set, said bounded region having a randomly selected size (D), and constraining selection of the elements such that the selected elements lie entirely within the defined bounded region.

11. A method according to claim 1 in which, on each iteration, the number of elements (m) to be selected from the first ordered set is selected at random, and in which the step of updating the score increments the score by an amount which is a monotonically increasing function of the number (m) of elements.

12. A computer implemented method of comparing a first pattern represented by a first ordered set of elements each having a value with a second pattern represented by a second ordered set of element each having a value, comprising iteratively performing the steps of:
  using at least one computer with accessible input/output to perform the following steps:
  (i) selecting a plurality of elements from the first ordered set;
  (ii) for each selected element of the first ordered set, selecting an element from the second ordered set, such that the selected elements of the second ordered set have, within the second ordered set, a set of positional relationships relative to each other that is a transformation of, the set of positional relationships that the selected plurality of elements of the first ordered set have relative to each other,
  (iii) comparing the value of each of the selected elements of the first ordered set with the value of the correspondingly positioned selected element of the second ordered set in accordance with a predetermined match criterion to produce a decision that the selected plurality of elements of the first ordered set does or does not match the selected plurality of elements of the second ordered set;
  (iv) in the event of a match, updating at least one similarity score;
  in which, on each iteration, the number of elements (m) to be selected from the first ordered set is selected at random, and in which the step of updating the score increments the score by an amount which is a monotonically increasing function (f(m)) of the number (m) of elements
  wherein a parameter (R) associated with the second ordered set determines whether or not a reflection should be applied to the positional relationships.

13. A method according to claim 11 in which the function of the number (m) of elements is equal to the number of elements.

14. A method according to claim 11 in which the function increases more rapidly than the number (m) of elements than does the number (m) of elements.

15. A method according to claim 1, in which each value (a) comprises a plurality of components.

16. A method according to claim 1, comprising firstly processing the first and second ordered set to identify regions thereof containing significant detail, and in which the selection of elements is constrained such that at least one of the selected elements of the first ordered set shall lie in the or an identified region of the first ordered set and/or that at least one of the selected elements of the first ordered set shall lie in the or an identified region of the first ordered set.

17. A method according to claim 1 including analysing those values of the selected element positions that result in a match.

* * * * *